United States Patent
Ramachandra Iyer et al.

(10) Patent No.: US 10,490,185 B2
(45) Date of Patent: Nov. 26, 2019

(54) METHOD AND SYSTEM FOR PROVIDING DYNAMIC CONVERSATION BETWEEN APPLICATION AND USER

(71) Applicant: WIPRO LIMITED, Bangalore (IN)

(72) Inventors: Manjunath Ramachandra Iyer, Bangalore (IN); Meenakshi Sundaram Murugeshan, Bangalore (IN)

(73) Assignee: Wipro Limited, Bangalore (IN)

( * ) Notice: Subject to any disclaimer, the term of this patent is extended or adjusted under 35 U.S.C. 154(b) by 67 days.

(21) Appl. No.: 15/817,891

(22) Filed: Nov. 20, 2017

(65) Prior Publication Data
US 2019/0096394 A1    Mar. 28, 2019

(30) Foreign Application Priority Data
Sep. 27, 2017   (IN) ............................. 201741034287

(51) Int. Cl.
| | | |
|---|---|---|
| *G10L 15/00* | (2013.01) | |
| *G10L 15/18* | (2013.01) | |
| *G06F 3/0482* | (2013.01) | |
| *G06F 17/27* | (2006.01) | |
| *G10L 15/22* | (2006.01) | |
| *G10L 15/08* | (2006.01) | |
| *G06F 3/16* | (2006.01) | |
| *G06F 3/01* | (2006.01) | |
| *G06F 3/0488* | (2013.01) | |

(52) U.S. Cl.
CPC ........ *G10L 15/1815* (2013.01); *G06F 3/0482* (2013.01); *G06F 17/2785* (2013.01); *G10L 15/22* (2013.01); *G06F 3/017* (2013.01); *G06F 3/04883* (2013.01); *G06F 3/167* (2013.01); *G10L 2015/088* (2013.01)

(58) Field of Classification Search
USPC ................................. 704/231–257, 270–275
See application file for complete search history.

(56) References Cited

U.S. PATENT DOCUMENTS

| | | | |
|---|---|---|---|
| 6,901,366 B1 | 5/2005 | Kuhn et al. | |
| 7,228,278 B2 | 6/2007 | Nguyen et al. | |
| 7,627,466 B2* | 12/2009 | Ramsey | G06F 17/278 704/257 |
| 7,941,312 B2 | 5/2011 | Jindal et al. | |
| 8,032,375 B2* | 10/2011 | Chickering | G06Q 10/10 704/231 |
| 2007/0203869 A1 | 8/2007 | Ramsey et al. | |
| 2014/0257793 A1 | 9/2014 | Gandrabur et al. | |
| 2015/0317302 A1* | 11/2015 | Liu | G06F 17/28 704/9 |

* cited by examiner

*Primary Examiner* — Jesse S Pullias
(74) *Attorney, Agent, or Firm* — Finnegan Henderson, Farabow, Garrett & Dunner, LLP (57) ABSTRACT

A method and system for providing dynamic conversation between an application and a user is discussed. The method includes utilizing a computing device to receive a requirement input from the user for the application. The method further includes determining a goal of the user based on the requirement input. Based on the goal, a plurality of conversation threads is initiated with the user, wherein each of the plurality of conversation threads has a degree of association with the goal. Thereafter, a plurality of slots is dynamically generated based on the goal and the plurality of conversation threads. A slot of the plurality of slots stores a data value corresponding to the requirement input of the user.

18 Claims, 6 Drawing Sheets

METHOD AND SYSTEM FOR PROVIDING DYNAMIC CONVERSATION BETWEEN APPLICATION AND USER

TECHNICAL FIELD

This disclosure relates generally to semantic communication and more particularly to method and system for providing dynamic conversation between an application and a user.

BACKGROUND

Generally, semantic communication with machines involves Natural Language Processing (NLP) and Natural Language Understanding (NLU), both of which use computer processing to fetch information from inputs, such as, human generated speech or text. The application of such technology involves processing speech or text queries in multi-modal conversational dialog applications. In a conversational dialog application, the components such as dialogue manager, automatic speech recognition engine, natural language understanding engine, and clients are available that conventionally perform their tasks. These conventional methods utilize the conversation engine and lack in identifying answers to sequential queries. Moreover, such methods do not identify the scope of main intent (i.e., theme), question type, entities, and their relationships in the conversation flow. Further, the ability to provide succinct responses or suggestions based on partial queries is missing in these conventional methods.

The conventional methods involve analyzing all possible answers to a query based on semantic analogy. Further, such methods do not make optimized usage of memory slots available to support conversation threads between the application and the user. This results in unnecessary utilization of a processor memory.

SUMMARY

In one embodiment, a method for providing dynamic conversation between an application and a user is discussed. The method includes utilizing a computing device to receive a requirement input from the user for the application. Then determine a goal of the user based on the requirement input. Based on the goal, a plurality of conversation threads is initiated with the user. Each of the plurality of conversation threads has a degree of association with the goal. Thereafter, a plurality of slots is dynamically generated based on the goal and the plurality of conversation threads. A slot of the plurality of slots stores a data value corresponding to the requirement input of the user.

In another embodiment, a system for providing dynamic conversation between an application and a user is disclosed. The system includes an application unit associated with the application, a processor coupled to the application unit, and a memory communicatively coupled to the processor and having processor instructions stored thereon. The memory causes the processor, on execution to receive a requirement input from the user for the application unit. Then determine a goal of the user based on the requirement input and initiate a plurality of conversation threads with the user based on the goal. Each of the plurality of conversation threads has a degree of association with the goal. Then dynamically generate a plurality of slots based on the goal and the plurality of conversation threads. A slot of the plurality of slots stores a data value corresponding to the requirement input of the user.

In yet another embodiment, a non-transitory computer-readable storage medium is disclosed. The non-transitory computer-readable storage medium has instructions stored thereon, a set of computer-executable instructions causing the system for dynamic conversation between an application and a user to perform steps including receiving a requirement input from the user for the application. Then determining a goal of the user based on the requirement input. Based on the goal, initiating a plurality of conversation threads with the user. Each of the plurality of conversation threads has a degree of association with the goal. Thereafter, dynamically generating a plurality of slots are based on the goal and the plurality of conversation threads. A slot of the plurality of slots stores a data value corresponding to the requirement input of the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Additional illustrative embodiments are listed below. In one embodiment, a computing device 100, in which various embodiments may be employed, is provided in FIG. 1. Computing device 100 is capable of running one or more applications and establishing communication with users. Examples of computing device 100 may include, but are not limited to a computer, a smart phone, a Personal Digital Assistants (PDA), a vehicle communication unit, a laptop and so forth.

Figure 1:
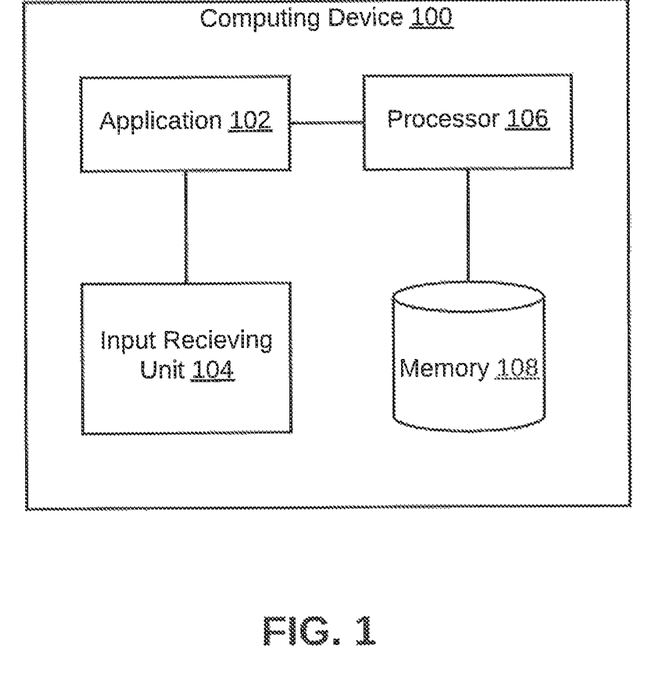
FIG. 1 illustrates a computing device, in which various embodiments may be employed.

Computing device 100 includes an application 102. Application 102 may be a software program capable of running on computing device 100 and receiving inputs from a user for operation. In an embodiment, application 102 may be an installable application on a smart phone and is capable of receiving inputs from a user of the smart phone. For receiving inputs from a user, application 102 is coupled to a user input detection module 104. User input detection module 104 is an interface for the user to provide inputs. Such inputs may be received in any form, for example, voice input, text input, sound input, gesture input, biometric input and so forth. Accordingly, examples of user input detection module 104 may include, but are not limited to a microphone, a touch pad, a keyboard, a finger print sensor and so forth.

User input detection module 104 and application 102 are coupled such that any input received from user over user input detection module 104 invokes application 102. Thereafter, application 102 runs using a processor 106 and a memory 108. Memory 108 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM). Processor 106 executes software instructions to enable functioning of computing device 100 and application 102. Further, processor 106 is coupled to memory 108 for storing such instructions and data corresponding to application 102. Functioning of these elements is further explained in detail in conjunction with FIG. 2 and FIG. 4.

Figure 2:
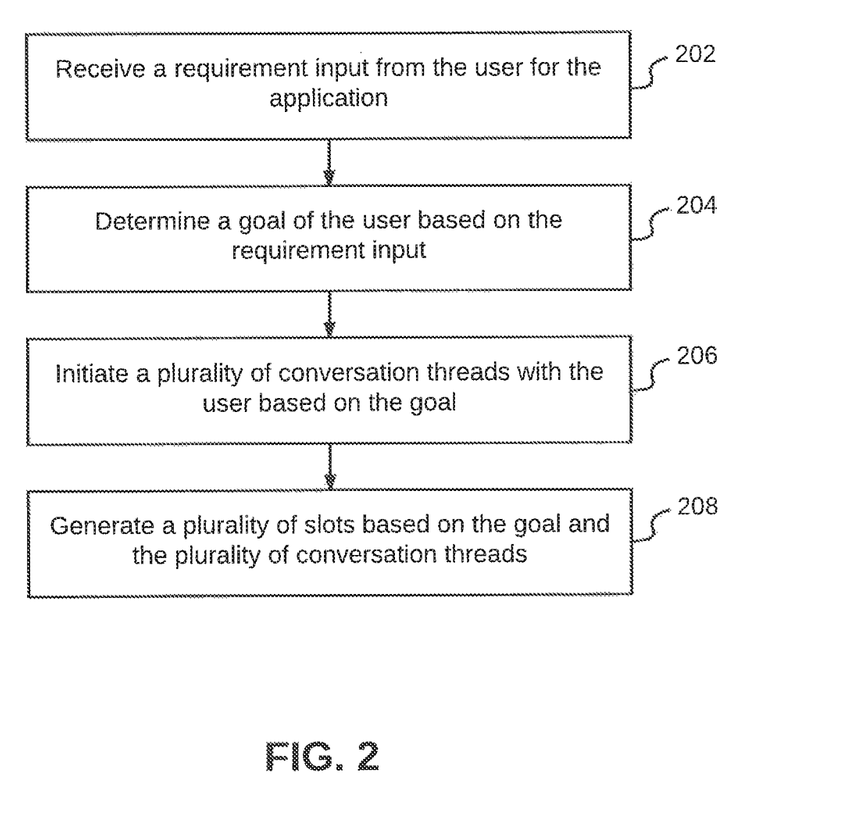
FIG. 2 illustrates a flow chart of method for providing dynamic conversation between an application and a user.

Referring now to FIG. 2, a flowchart of a method for providing dynamic conversation between an application and a user is illustrated, in accordance with an embodiment. A computing device, such as, computing device 102, may be utilized for this purpose. At step 202, a requirement input for an application may be received from a user. The application may be application 102 as described in FIG. 1. The requirement input is a semantic input provided by the user corresponding to a requirement. The requirement input may be a voice input, a hand-typed input, a text input, or an audio-video input. For example, the requirement input may be a query that is verbally shared by the user with the application and thus may be a combination of words formulated semantically in a given language.

In an embodiment, the application may be invoked in response to receiving an input gesture from the user. The input gesture, for example, may be a touch gesture or a hover gesture to open an icon that is related to the application. Opening the icon invokes the application in order to initiate interaction with the user. The application may greet the user and then the user may provide the requirement input.

Once the requirement input is received, a goal associated with the requirement input may be determined at step 204. The requirement input provided by the user may be analyzed to identify the associated goal. Determining the goal may include identifying an intention of the user based on semantic meaning of the requirement input. The requirement input may be utterances of sentences by the user.

Based on the identified goal, a plurality of conversation threads may be initiated with the user, at step 206. The plurality of conversation threads may be communication based responses that are provided by the application to the user in response to the requirement input. The conversation threads may be sequential or parallel query responses provided to the user. These conversation threads may be identified by first identifying one or more keywords associated with the goal of the user. Then, the one or more keywords may be mapped with conversation menus, which are like menu options related to the goal. The conversation menus may be attributed with weightages corresponding to parameters related to the goal. Thereafter, the conversation threads may be extracted from the conversation menus based on the at least one weightage and a degree of association with the goal. This is further explained in conjunction with FIG. 3.

At step 208, a plurality of slots may be dynamically generated based on the goal of the user and the plurality of conversation threads. The plurality of slots may be storage spaces in a memory of the computing device, for example, memory 108 in FIG. 1. The plurality of slots may store a data value corresponding to the requirement input of the user. The slots may be maintained in shared space of the memory and are filled with multiple conversation threads. Such slots may be dynamically generated by removing duplicates between the stored conversation threads. The storage duration of a data value within a slot may also be optimized based on conversation of the application and the user. Therefore, as the conversation progresses, slots with required conversation threads may be maintained and unrequired conversation threads stored in the slots may be dynamically erased and replaced with new data values as per the requirement of the user.

The method dynamically generates, merges, and/or deletes the slots. Such method can be used to support more than one concurrent conversation threads with the user to reuse the information effectively and minimize the time and memory resources. Further, a path of minimum conversation is initiated to get optimal' information flow on either way thus optimizing the solute on.

Figure 3:
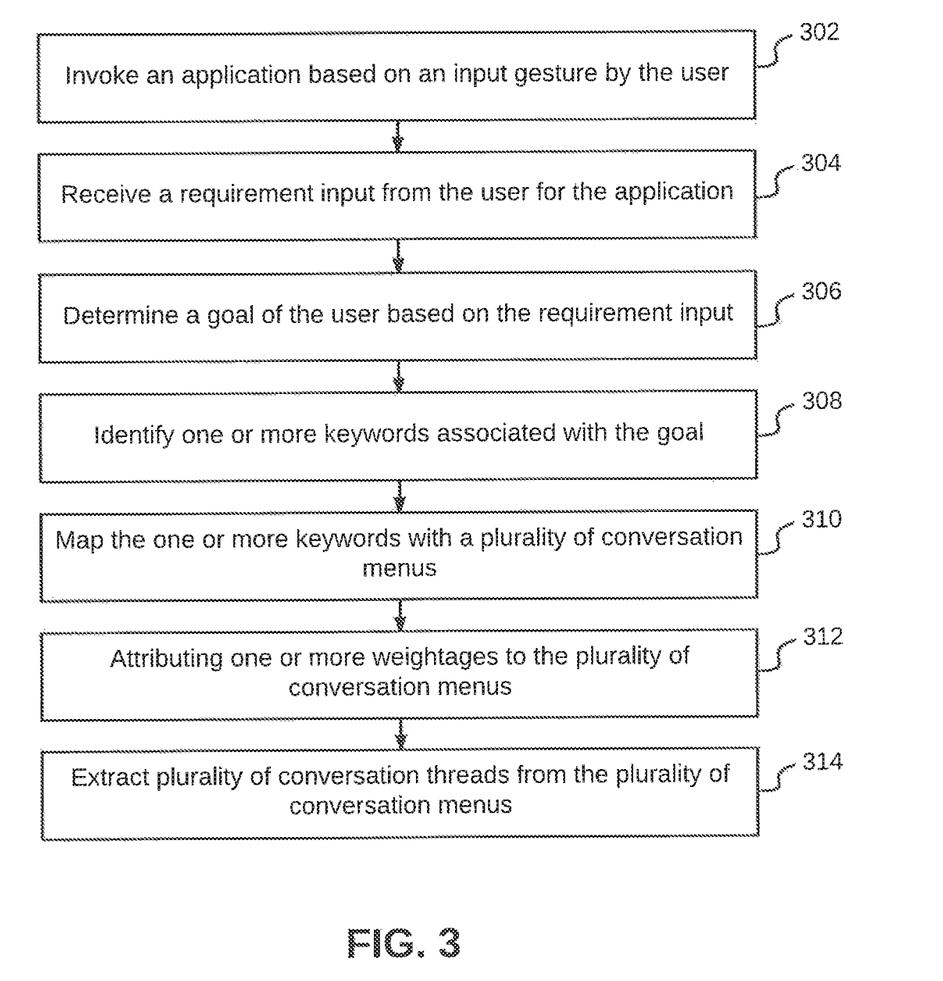
FIG. 3 illustrates a flow chart of method for providing dynamic conversation between an application and a user, in accordance with another embodiment.

Referring now to FIG. 3, a flowchart of a method for providing dynamic conversation between an application and a user is illustrated, in accordance with another embodiment. At step 302, an application may be invoked based on an input gesture from the user. The input gesture, for example, may be a hand gesture, a touch gesture, a voice gesture, or a movement gesture. The application, when invoked, may greet the user and initiate a conversation to identify requirements of the user. Once the application is invoked, a requirement input may be received from the user, at step 304. The requirement input may be a semantic input provided by the user corresponding to a requirement. This has been explained in detail in conjunction with FIG. 2.

Based on the requirement input, a goal associated with the requirement input may be determined, at step 306. Determining the goal may include identifying an intention of the user based on semantic meaning of the requirement input. By way of an example, consider that a user interacts with a travel based application and provides a voice input: "I want to travel to San Francisco." In this case, "Travel" is determined as the goal/intention of the user.

Thereafter, at step 308, the application may analyze the goal and the requirement input to identify one or more keywords associated with input made by the user. For example, as the user utters some sentence while interaction with the application, the application receives this as a requirement input and extracts important keywords from the utterance. These keywords may be mapped with a plurality of conversation menus at step 310. The conversation menu may refer to possible options and actions around a specific goal/intention of the user. By way of an example, the user provides the voice input: "I want to Travel." In this scenario, the associated keywords are "Hotel," "Local Travel," and "Flight Booking." Thus, conversation menus that are associated with these keywords are identified.

After determining the goal/intention in first few sentences, the conversation menu is extracted based on the associated words with "Travel." Here, the associated words can be extracted using different mechanisms such as previous conversation goal/intention of the user.

At step 312, weightages may be attributed to the plurality of conversation menus. The weightages may be associated with one or more parameters related to the goal. Some examples of weightages are given below:
Previous goal/intention and frames=10%
Local Database=20%
Graph=30%
Contextual Word documentation matrix=40%

The weightages and associated parameters may indicate a degree of association with the goal. The degree of association may indicate how closely the one or more parameters are related to the goal. In continuation of the example above, degree may be computed as the following ratio: (number of times "lodging" appears along with travel)/(total number of times "lodging" appears).

A contextual word documentation term matrix is obtained by taking paragraphs of text that include related keywords. In this case, two conditions need to be satisfied, i.e., the co-occurrence of terms of interest (for example, flight booking and lodge booking) in a paragraph and correlation of other terms across consecutive paragraphs. If the correlation is higher than a threshold value, the association of the terms of interest may be taken across the paragraphs.

Thereafter, at step 314, a plurality of conversation threads may be extracted from the plurality of conversation menus. The plurality of conversation threads may be communication based responses that are provided by the application to the user in response to the requirement input. These communication threads may be sequential or parallel query responses provided to the user. The communication threads may be extracted based on weightages and degree of association with the goal. In an embodiment, the communication threads that have a degree of association greater than a given threshold may be selected, For example, if the degree of association is greater than 0.5 (or a predefined threshold based on field experience), the words may be considered for conversation. The order of asking may depend on the degree of association. In continuation of the example given above, the degree of association between different words are shown below:
"Flight booking" and "Lodge"→0.7
"Flight booking" and Local travel→0.5
"Flight booking" and "local hospital details"→0.01

Based on higher degree of association, the conversation threads are extracted and then stored in a plurality of slots. In the above example, as the predefined threshold is 0.5, parallel or sequential conversation threads for "flight booking" and "local hospital details" may not be extracted. This is further explained in detail in conjunction with FIG. 4.

Figure 4:
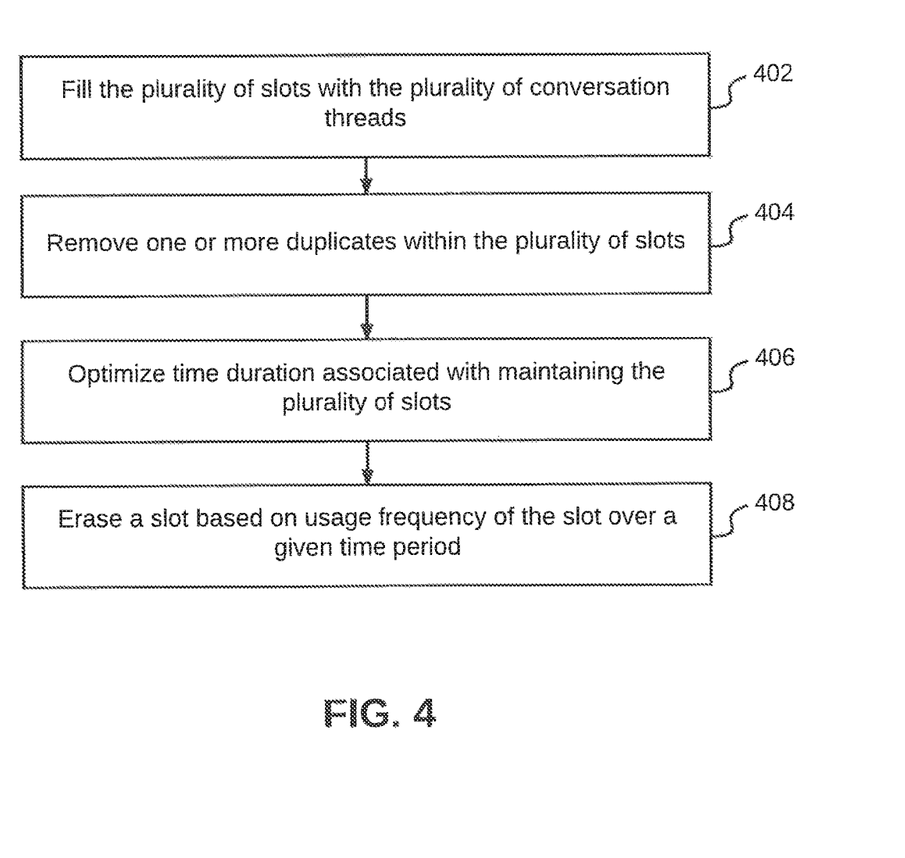
FIG. 4 illustrates a flow chart of method for managing slots to provide dynamic conversation between an application and a user, in accordance with yet another embodiment.

Referring now to FIG. 4, a flowchart of a method for managing slots to provide dynamic conversation between an application and a user is illustrated, in accordance with an embodiment. The method functions in conjunction with steps as explained in FIG. 2 and FIG. 3. Based on communication established between the application and the user, a plurality of slots may be generated dynamically to store the plurality of conversation threads.

At step 402, the plurality of slots may be filled with the communication threads. The slots may be predefined for various threads, for example, for travel and hotel bookings. The slots may be generated hierarchically. In a scenario, if the conversation thread has multiple options, at least one of them is taken forward with common information shared across other parallel conversation threads. The application may switch across the conversation threads based on the maximum number of empty slots to be filled in the next state. The user utterances may get filled in the slots of frames. In an embodiment, the slots may be filled with required conversation threads based on parsing the utterances into various parts of speech, for example, subject, predicate, etc. By way of an example, "I want to know my bank balance," may be parsed into the following parts:
Subject→I
Action→Know
Pronoun→My
Object→Bank balance In order to check sufficiency of the data to generate response, following steps may be followed. First, the list of actions that are supported by the application are searched. The list is maintained in a conversation directory in a dialog manner. It may be similar to functions that are used to generate the response. An example of such functions is provided below:
Balance=Balance (number (got from Login), account type, date, min (optional)/max(optional)/ average(optional), duration (optional)).
To identify fields for completing the function, the application may ask further questions related to minimum and maximum balance. The application may render a question to the user: "You want to know min or max balance?" The user may specify that "I want to know my minimum balance from Jan to March," which is a generic answer provided by the user in response to the application's question.
In the answer provided by the user, the pronoun 'my' refers to his account number and classifies to first question linked, to his account number. Now, subsequently, the application may ask the user for any missing fields that are required to generate the frame.

The classification of an utterance in functions may happen through a deep learning network such as Long Short-Term Memory (LSTM). Here, the parts of speech from the parser such as subject, predicate, etc., may be fed as the input and the function may be taken as the output. The slots may be predetermined for a given frame, if ontology based approach is used. The frame title may also be fixed. By way of an example, in a requirement, the user may ask, "I want to know my bank balance." In ontology based frame generation, it is associated with the frame "balance" and with slots of "account type," whether current or savings and date slot, in which current date may be the default slot. The response generation by the application is based on these slots.

After filling the plurality of slots, one or more duplicates within the slots may be removed, at step 404. In other words, any redundancy between the conversation threads as stored in the slots may be removed. The conversation threads may be parallel threads stored in the slots, thus, in this case, corresponding data values between the parallel threads are compared and duplicates are removed.

At step 406, time duration of maintaining the plurality of slots may be optimized. This involves dynamic allocation of the slots based on possible requirements. This may further cause deallocation of the slots to remove the conversation threads that have not been used for a predefined time period. Allocation of the slots may happen once a context changes. Each utterance of the user is compared with a previous utterance. If there is nothing common between consecutive utterances, or if there is no reference in current utterance to previous utterances, the context may be changed. Once the context changes, all the above steps may be re-visited and repeated to initiate parallel conversation threads for the new context and slots are allocated and common slots are de-allocated.

In an embodiment, slots and corresponding dependent slots may be maintained. The necessary slots for a theme i.e., main intent in the user query, may change dynamically. Accordingly, the dependent slots may vary to support hierarchical sequences of a conversation, thereby reducing the type of clarification questions being asked by the user. Here, the conversation logs may be used to automatically derive conflicting slots based on failure case analysis and repeated clarification questions. In addition, the partial queries may be supported using prior context retain/remove mechanism. The conflicting slots may be classified as global and local slots. The global conflicting slots may be common across all domains and local conflicting slots may be dynamically determined using the ontology relationships and conversations logs.

In another embodiment, the slots may be allocated based on the user gesture and emotion that may require a different response. For example, the user is unhappy or is likely to be unhappy based on the system responses. In this scenario, when a conversation engine provides a response "EMI recently increased by 0.5%." The response depends both on the slot value and on the emotion value. In the continuation of the example, when the user is happy, a response, for example, "it has increased by 20%," for a query on EMI hike, may be a desired response. On the other hand, when the same user is not receptive, the response may be provided in two steps. For example, the application first provides a response: "EMI is significantly increased due reasons beyond control." Thereafter, the user may ask: "by how much?" The application provides the response as: "up to 20% for various categories." Thus, an emotion based judgement of the conversation threads may be performed. Accordingly, based on utilization and sequence of the conversation threads, optimization of the slots may be performed.

Thereafter, erasure of a slot may be performed based on usage frequency of the slot over a given time period, at step 408. In case the slot is not used for the given time period, the slot may be erased. In an exemplary embodiment, a decision on the erasure of slots may be taken based on the following series of steps:

a) Every time a slot is used, its value may become 100
b) In the next utterance, it may become 90, if the slot is not used to generate response. If the slots derived from this slot are used in the response, it may become 95.
c) The slot may vanish once it becomes "0" or reaches a predetermined value. As a result, different slots will have different lifetime.

In another embodiment, a degree is considered to determine lifetime of the slots. The slots may have priority, for example, a date slot of travel dictates the lodge based information. If the date slot is removed, a lodge slots' value may also be decreased and vice versa. If the date slot is removed, all the dependent slots of the lodge booking may be erased or removed.

As an example of the above method steps, a scenario is provided wherein requirement of the user is related to travel. Accordingly, requirement input is provided by the user. The application ensures relevant questions so that maximum information useful for more than one thread is provided by the user. The application may query the user: "Are you looking for lodges and local travel along with the flight booking?" In this example, the user may say only lodges (and not local travel) with travel.

Further, none of the local travel related slots may be considered at this point of time. Alternately, the application may examine user behavior such as change of mind after some time, such as, last time the user initially denied the local transport; but after booking the flight and lodge, the user asked for it. The application may maintain minimum information (or base information), such as, date and time. Based on the user's change of mind, further slots may be generated and filled up by querying the user, such as, taxi or monorail for local transport. The base information may be related to the common slots or windows for two consecutive threads, for example, first conversation thread for flight booking and second conversation thread for lodge booking.

Both conversation threads may include information related to destination, date, and time. Any duplications are removed from the slots. Only one instance of destination, date, and time may be maintained in the slots. In another scenario for the example above, the application may determine the reason for not opting for associated capsules (i.e., lodging and local travel) and invokes a sub-conversation that includes offers to facilitate resolution of the issues. If the reason falls beyond a predefined set of reasons, the application may not invoke any sub-conversation.

Figure 5:
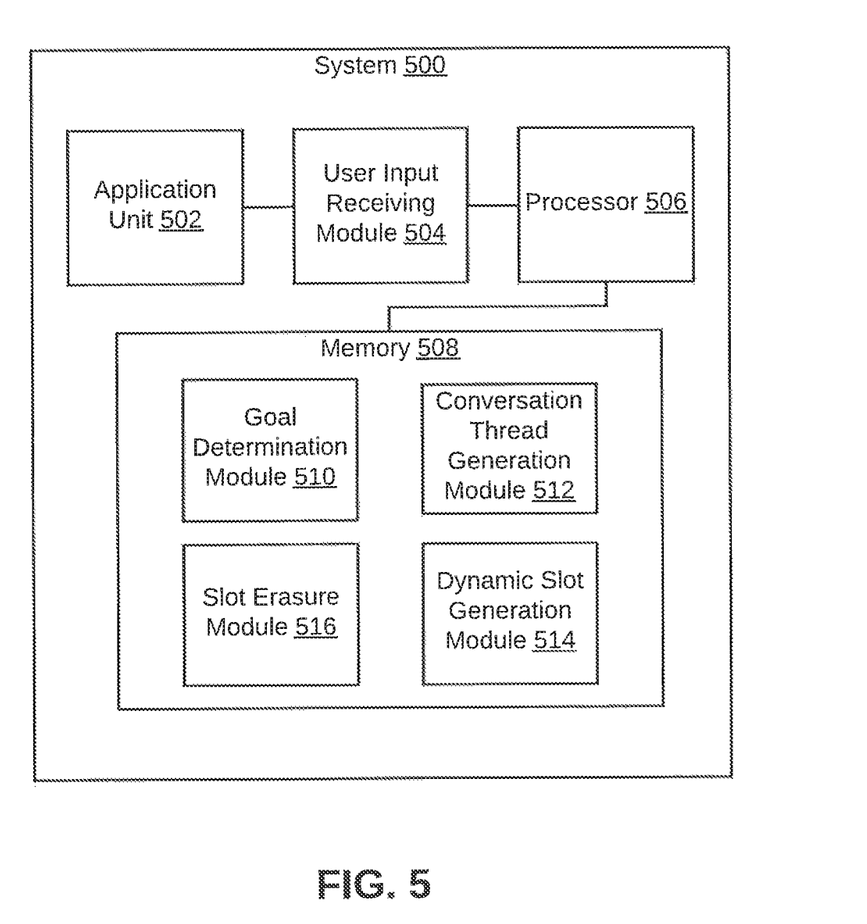
FIG. 5 illustrates a block diagram of a system for providing dynamic conversation between an application and a user.

Referring now to FIG. 5, a block diagram of a system 500 for providing dynamic conversation between an application and a user is illustrated, in accordance with an embodiment. System 500 is capable of running one or more applications and establishing communication with users. In an embodiment, system 500 may be a conversation engine for running various conversation based solutions for a user. FIG. 5 is explained in conjunction with FIG. 2-FIG. 5.

System 500 may include an application unit 502 for running an application on system 500 and a user input receiving module 504 for receiving input corresponding to the application. User input receiving module 504 and application unit 502 may be coupled such that any input received from a user over user input receiving module 504 may invoke application unit 502. These may further be coupled to a processor 506 and a memory 508. Processor 506 and memory 508 may be coupled to run various instructions. Memory 508 may be a non-volatile memory or a volatile memory. Examples of non-volatile memory, may include, but are not limited to a flash memory, a ROM, a PROM, EPROM, and EEPROM memory. Examples of volatile memory may include, but are not limited DRAM and SRAM.

These instructions in memory 508 may be stored as various modules, i.e., a goal determination module 510, a conversation thread generation module 512, a slot erasure module 516, and a dynamic slot generation module 514. As a user input is received at the user input receiving module 504, application unit 502 may be invoked. Application unit 502 may then greet the user and may establish a communication. The user may then provide a requirement input via user input receiving module 504. In response to the requirement input, goal determination module 510 may be activated to identify a goal associated with the requirement input provided by the user. Determining the goal may include identifying an intention of the user based on semantic meaning of the requirement input. The requirement input may be utterances of sentences by the user.

Based on the goal as identified, a plurality of conversation threads may be generated at conversation thread generation module 512. The plurality of conversation threads may be communication based responses that are provided by the application to the user, in response to the requirement input. These conversation threads may be identified by first identifying one or more keywords associated with the goal of the user. Then the one or more keywords may be mapped with conversation menus. The conversation menus may be like menu options related to the goal. These conversation menus may be attributed with weightages corresponding to parameters related to the goal. Thereafter, the conversation threads may be extracted from the conversation menus based on the at least one weightage and a degree of association with the goal. In an embodiment, conversation thread generation module 512 may further include modules to perform above steps.

Conversation thread generation module 512 may then invoke dynamic slot generation module 514, which is configured to generate a plurality of slots. The plurality of slots may store a data value corresponding to the requirement input of the user. The slots may be filled with the conversation threads corresponding to the requirement input of the user.

Dynamic slot generation module 514 may be further configured to generate the slots to store the conversation threads and then remove duplicates between the stored conversation threads. One or more of the slots may be allocated or de-allocated based on required duration of a data value within a slot and conversation of the application and the user. Therefore, as the conversation progresses, slots with required conversation threads may be maintained and unrequired conversation threads stored in the slots may be dynamically erased and replaced with new data values as per the requirement of the user. Erasing of the slots may be performed by a slot erasure module 516 that erases a slot based on usage frequency over a given period. In case the slot is not used for a given period, then the slot may be erased.

Above system 500 is robust and dynamic in performing effective conversation with the user. Generally, in a domain specific conversation engine, context tracking plays a critical role in providing specific responses to a user. Based on the current theme in a query provided by the user, the relevant context may be retained and irrelevant context may be removed to accommodate partial queries.

Unlike the conventional systems and methods, the proposed system may be used for switching across different (parallel) conversation readily supported by multiple (parallel) conversation threads. Further, if the system realizes that the user has low memory, the slots may be retained for a longer duration because the user tends to remember something and change them in real time. In addition, the system may be used to support the users who ask queries on multiple topics and the users with low memory.

By way of an example, system 500 may be a banking based conversation engine and may be termed as a banking genie. A user invokes the banking genie to fetch some information on a housing loan. After receiving the input, the banking genie responds with an answer. The user abruptly switches over to the process of opening a D-mat account. In this case, the banking genie-retains some of the slots such as his age range and profession, from the conversation related to housing loan, to provide customized responses. The user may again switch back to the conversation on housing loan. Based on the frequent conversation switching by the user, the banking genie understands the user's haphazard pattern of conversation and thus retains mutually exclusive slots (with respect to changed context) from there on.

By way of another example, system 500 may be a retail based conversation engine and may be termed as a retail genie. A user, who has short memory, invokes the retail genie and asks questions on policy for return of goods. The retail genie provides responses to the user. If the user asks the same question after two minutes, the retail genie, based on the behavior in the previous (and present) transactions, knows that the user has short time memory. Thus, instead of treating the conversation as new transaction, the retail genie provides the required information to the user without requesting for further details.

By way of yet another example, system 500 may be a hospitality based application and may be termed as hospital genie. A user may be travelling to "San Francisco," and may invoke the hospitality genie to support his/her travel logistics. In the beginning itself, the hospitality genie may ask the user if he is also looking for a lodge. When the user responds with a yes, the hospitality genie invokes two parallel capsules (or threads) of conversation, i.e., one for booking flights and the other one to book hotel. The conversations of these threads are intermixed with the data being shared by both threads (i.e., the date of departure, place, etc.). The time of departure can be function of cost and availability of lodge (for example: lodge may charge full tariff even if checked in an hour earlier than stipulated time). Some lodges have the tariff charged hourly basis. In such cases, booking time depends on the flight timings that can come with various packages. The optimization algorithms need to consider both these data (and user tolerance for time and money). Essentially, the data from both the threads are required at a time. This data may be wiped out after use even when the conversation is still on, reducing the duration of the stay of the data.

Figure 6:
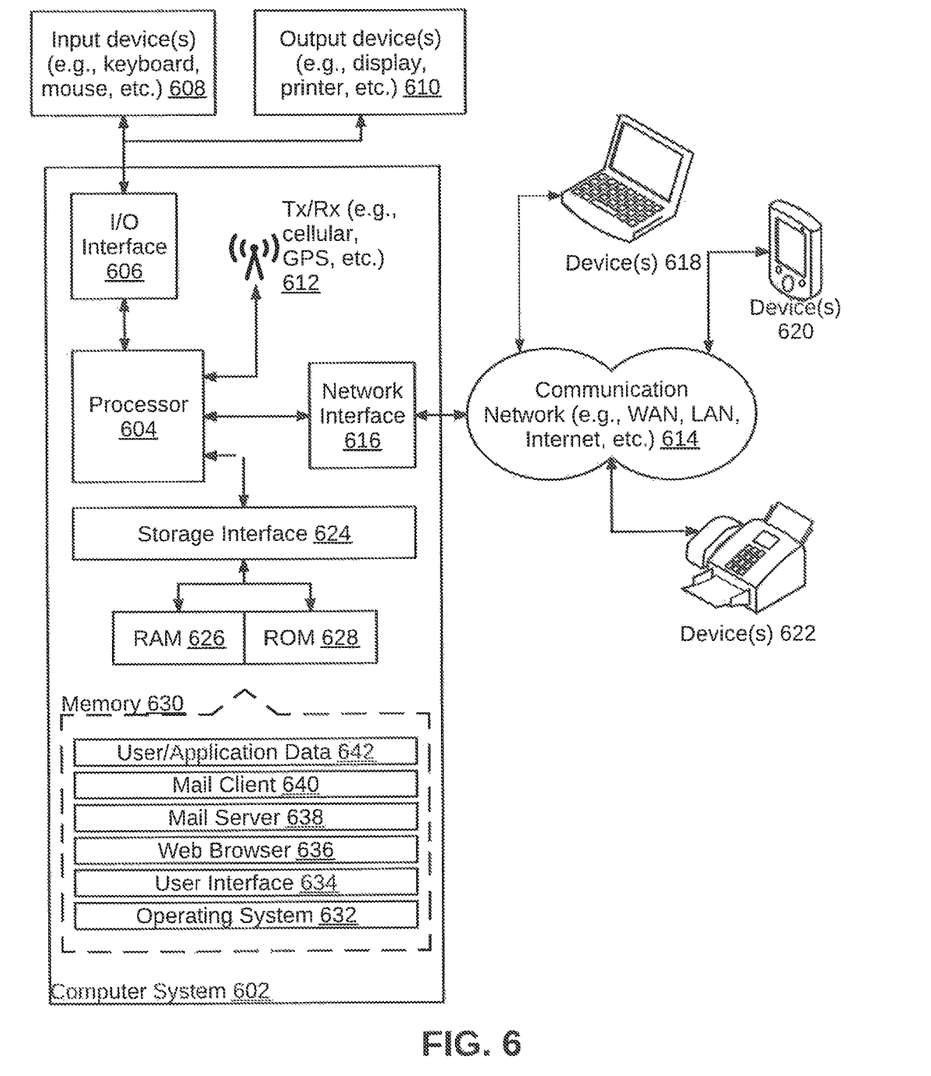
FIG. 6 illustrates a block diagram of an exemplary computer system or implementing various embodiments.

Referring now to FIG. 6, a block diagram of an exemplary computer system for implementing various embodiments is illustrated. Computer system 602 may include a central processing unit ("CPU" or "processor") 604 that includes at least one data processor for executing program components for executing user-generated requests or system-generated requests. A user may include a person, a person using a device such as such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed relating to processor 604. Transceiver 612 may facilitate various types of wireless transmission or reception. For example, transceiver 612 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network interface 616 and communication network 614, computer system 602 may communicate with devices 618, 620, and 622. The devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 602 may itself embody one or more of the devices.

In some embodiments, processor 604 may be disposed in communication with one or more memory devices (e.g., RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, user interface application 634, web browser 636, mail server 638, mail client 640, user/application data 642 (e.g., any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOGGLE® ANDROID® platform, BLACKBERRY® OS platform, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component, Web browser 636 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 602 may implement a mail server 638 stored program component. Mail server 638 may be an Internet mail server such as MICROSOFT® EXCHANGE® mail server, or the like. Mail server 638 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 638 may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement a mail client 640 stored program component. Mail client 640 may be a mail viewing application, such as APPLE MAIL® mail client, MICROSOFT ENTOURAGE® mail client, MICROSOFT OUTLOOK® mail client. MOZILLA THUNDERBIRD® mail client, etc.

In some embodiments, computer system 602 may store user/application data 642, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide a method and system for providing dynamic conversation between a user and an application. The invention enables effective and progressing conversation between the user and the application. Overall there is reduction in memory requirement and efficient usage of APIs in order to cater to more users at a given time. Given invention is better optimized to meet the goals based on relevant information as available from different conversation threads.

The proposed mechanism works on fixed slots although course of dialog may change dynamically. Further, the invention proposes no duplications in slots, so minimal slots are created and retained for minimum duration. The slots are dynamically generated/created while considering multiple conversation threads to reduce the overall conversation time and reuse the information, although an utterance of user may not require all the slots. The proposed mechanism focuses on how long to retain the slots. So, the historical data is utilized in estimating type of slots rather than content of slots.

The system dynamically captures and interprets instantaneous preferences of the user from among the content being consumed. Further, change in user intent is automatically detected. The slots are then dynamically generated and maintained. Dynamic dependent slots are also generated based on the sub-topics in the conversation.

The method enables effective utilization of the memory as an inference mechanism is utilized to dynamically retain/remove relevant and irrelevant information in conversation history. There is contextual mapping of the slots such that context dependent slot is retained/removed with time. The method also performs conversation log based clarification questions and analysis. It can handle unpredictable conversation, thereby reducing overall conversation time to achieve same goal. Using given invention, the overall memory required to support a conversation session is reduced. Further, the conversation time is reduced and prevents duplication in the conversation and resource requirement thus, improving the user experience.

The specification has described a system for dynamic conversation between a user and an application and method thereof. The illustrated steps are set out to explain the exemplary embodiments shown, and it should be anticipated that ongoing technological development will change the way functions are performed. Examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for providing dynamic conversation between an application and a user, the method comprising:
   receiving, by a computing device, a requirement input from the user for the application;
   determining, by the computing device, a goal of the user based on the requirement input;
   initiating, by the computing device, a plurality of conversation threads with the user based on the goal, wherein each of the plurality of conversation threads has a degree of association with the goal, wherein initiating the plurality of conversation threads comprises:
   identifying at least one keyword associated with the goal;
   mapping the at least one keyword with a plurality of conversation menus, wherein the plurality of conversation menus includes a plurality of options related to the goal;
   attributing at least one weightage to the plurality of conversation menus, wherein the at least one weightage corresponds to at least one parameter related to the goal; and
   extracting the plurality of conversation threads from the plurality of conversation menus based on the at least one weightage and a degree of association with the goal, wherein the degree of association is a predefined threshold; and
   generating dynamically, by the computing device, a plurality of slots based on the goal and the plurality of conversation threads, wherein a slot of the plurality of slots stores a data value corresponding to the requirement input of the user.

2. The method of claim 1, further comprising invoking the application based on an input gesture by a user, wherein the input gesture is at least one of a hand gesture, a touch gesture, a voice gesture, or a movement gesture.

3. The method of claim 1, wherein the requirement input is a semantic input relating to a requirement of the user.

4. The method of claim 1, wherein the requirement input is one of a voice input or a hand-typed input.

5. The method of claim 1, wherein determining the goal comprises identifying an intention of the user based on semantic meaning of the requirement input.

6. The method of claim 1, wherein generating dynamically the plurality of slots comprises:
filling the plurality of slots with the plurality of conversation threads;
removing one or more duplicates within the plurality of slots; and
optimizing time duration associated with maintaining the plurality of slots.

7. The method of claim 1, further comprising querying the user based on the plurality of conversation threads.

8. The method of claim 1, further comprising erasing a slot from the plurality of slots based on usage frequency of the slot over a given time period, wherein the usage frequency of the slot is lower than a threshold over the given time period.

9. The method of claim 1, wherein the plurality of slots is maintained hierarchically based on context of the plurality of conversation threads.

10. A system for providing dynamic conversation between an application and a user, the system comprising:
an application unit associated with the application;
a processor coupled to the application unit; and
a memory communicatively coupled to the processor and having processor instructions stored thereon, causing the processor, on execution to:
receive a requirement input from the user for the application unit;
determine a goal of the user based on the requirement input;
initiate a plurality of conversation threads with the user based on the goal, wherein each of the plurality of conversation threads has a degree of association with the goal, wherein to initiate the plurality of conversation threads, the processor instructions further cause the processor to:
identify at least one keyword associated with the goal;
map the at least one keyword with a plurality of conversation menus, wherein the plurality of conversation menus includes a plurality of options related to the goal;
attribute at least one weightage to the plurality of conversation menus; wherein the at least one weightage corresponds to at least one parameter related to the goal; and
extract the plurality of conversation threads from the plurality of conversation menus based on the at least one weightage and a degree of association with the goal, wherein the degree of association is a pre-defined threshold; and
dynamically generate a plurality of slots based on the goal and the plurality of conversation threads, wherein a slot of the plurality of slots stores a data value corresponding to the requirement input of the user.

11. The system of claim 10, wherein the processor instructions further cause the processor to invoke the application unit based on an input gesture by the user, wherein the input gesture is at least one of a hand gesture, a touch gesture, a voice gesture, and a movement gesture.

12. The system of claim 10, wherein the requirement input is a semantic input relating to a requirement of the user.

13. The system of claim 10, wherein the requirement input is one of a voice input and a hand-typed input.

14. The system of claim 10, wherein the processor instructions further cause the processor to determine the goal by identifying an intention of the user based on semantic meaning of the requirement input.

15. The system of claim 10, wherein to dynamically generate the plurality of slots, the processor instructions further cause the processor to:
fill the plurality of slots with the plurality of conversation threads;
remove one or more duplicates within the plurality of slots; and
optimize time duration associated with maintaining the plurality of slots.

16. The system of claim 10, wherein the processor instructions further cause the processor to query the user based on the plurality of conversation threads.

17. The system of claim 10, wherein the processor instructions further cause the processor to erase a slot from the plurality of slots based on usage frequency of the slot over a given time period, wherein the usage frequency of the slot is lower than a threshold over the given time period.

18. A non-transitory computer-readable storage medium comprising a set of computer executable instructions causing a computing device that includes one or more processors to perform steps including:
receiving a requirement input from the user for the application;
determining a goal of the user based on the requirement input;
initiating a plurality of conversation threads with the user based on the goal, wherein each of the plurality of conversation threads has a degree of association with the goal, wherein to initiate the plurality of conversation threads, the processor instructions further cause the processor to:
identify at least one keyword associated with the goal;
map the at least one keyword with a plurality of conversation menus,
wherein the plurality of conversation menus includes a plurality of options related to the goal;
attribute at least one weightage to the plurality of conversation menus; wherein the at least one weightage corresponds to at least one parameter related to the goal; and
extract the plurality of conversation threads from the plurality of conversation menus based on the at least one weightage and a degree of association with the goal, wherein the degree of association is a pre-defined threshold; and
generating a plurality of slots dynamically based on the goal and the plurality of conversation threads, wherein a slot of the plurality of slots stores a data value corresponding to the requirement input of the user.

* * * * *